J. Lebeau,

Fruit Knife.

No. 4,112. Reissued Aug. 30. 1870.

Attest,
H. Guillward
P. H. Layman.

Inventor,
Jacob Lebeau
By Knight Bros
Attys

N. PETERS, PHOTO-LITHOGRAPHER, WASHINGTON, D. C.

United States Patent Office.

JOHN JACOB LEBEAU, OF CINCINNATI, OHIO.

*Letters Patent No.* 56,235, *dated July* 10, 1866; *reissue No.* 4,112, *dated August* 30, 1870.

IMPROVED PARING-KNIFE.

The Schedule referred to in these Letters Patent and making part of the same.

*To all whom it may concern:*

Be it known that I, JOHN JACOB LEBEAU, of Cincinnati, Hamilton county, State of Ohio, have invented a certain new and useful Paring and Coring-Knife; and I hereby declare the following to be a full, clear, and exact description thereof, reference being had to the accompanying drawing making part of this specification.

*Nature and Object of Invention.*

My invention consists of a peculiarly-shaped knife, which, in connection with any suitable handle, is adapted to pare, slice, and remove the cores, eyes, stones, and other refuse matter from fruit and vegetables, and, in connection with a peculiarly-shaped handle and adjustable gauge, is adapted to remove the skin from fruit and vegetables with a definitely-adjusted thickness of paring.

The object of my invention is the production of an instrument which is adapted to core and slice rapidly and conveniently, and pare economically.

*Description of the Accompaning Drawing.*

Figure 1 is a perspective view of my knife, when used in connection with a handle and guide adapted for paring potatoes, &c.

Figure 2 exhibits the knife or blade, which, in connection with any suitable handle, can be used for paring, slicing, coring, stoning, &c.

Figure 3 represents detached views of the handle and gauge used, in connection with the blade, for definitely-adjusted paring.

Figure 4 is a cross-section through the handle, knife-blade, and gauge, when connected for paring potatoes, &c.

*General Description.*

A represents the handle which is used, in connection with the knife-blade, for paring potatoes, removing the eyes, &c.

It is constructed with a chamfered or bevel edge, B, and a recessed portion, C.

The chamfered part B, instead of being a continuous straight edge, is provided with a convex projection, *b*, and said chamfered edge is covered or fitted with an adjustable gauge or mouth-piece, D, of corresponding shape.

The gauge D is adapted to be set so as to allow of a greater or lesser width of slot between it and the knife E, by means of the set-screws *c c'*, which, passing through the slots *d d'* of the gauge, enter the handle A, and secure the gauge in any position to which it may be adjusted.

The distance between the gauge D and knife determines the thickness of paring to be removed from the fruit or vegetable, and, as this thickness cannot vary in action, it is evident that the instrument is adapted to prevent wasteful cutting.

E is the knife-blade, which, when used in connection with the handle A B, is provided with slots *e e'* and set-screws F F', and this blade projects some distance beyond the handle, as shown at E', the part which projects beyond the end of the handle being designed for slicing purposes, or dividing fruit preparatory to coring, stoning, &c.

The blade E is furnished with a swell or scoop, G, and, when the knife is used attached to the form of handle A B, this swell is opposite the projection *b*, thereby producing a uniform width of slot between the knife and gauge D.

Figure 1:
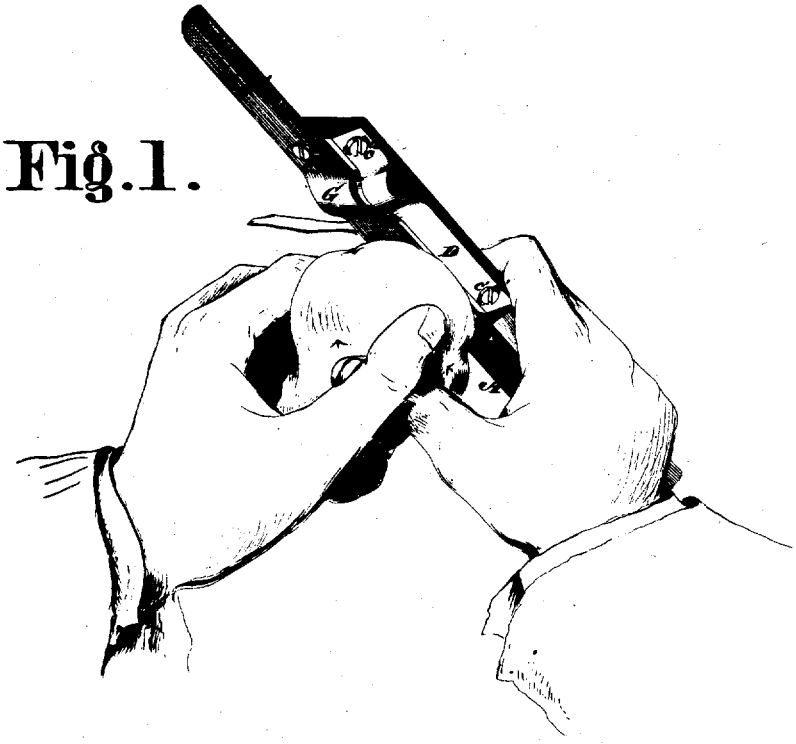
Figure 2:
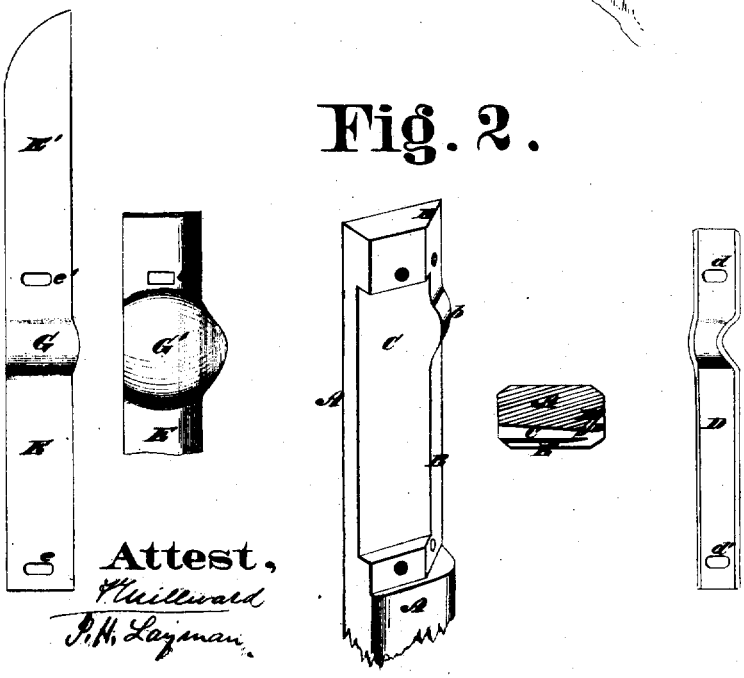

For peeling potatoes I prefer the knife, as shown in fig. 1, complete, the form of scoop G therein shown being all that is requisite for removing the eyes from the same, but for coring and stoning fruit the scoop may have the form shown at G', and, as it is obvious that for such purposes as coring, stoning, slicing, &c., there is no need of the gauge D or the part B C of the handle, the knife-blade, as shown in fig. 2, provided with either form of scoop therein illustrated, can be used in connection with any suitable handle.

The important peculiarity of the instrument exhibited in fig. 2 consists in the provision of the scoop G or G', which, after the fruit is divided, is adapted to remove the core quickly, conveniently, and without waste of the fruit.

When the blade E E' G, gauge D, and handle A B C are connected for peeling potatoes, &c., a thicker or thinner cut may be produced by simply setting the gauge to or from the knife, and, when the latter becomes worn, by frequent use or sharpening, the screws F F' and slots *e e'* enable its readjustment at any time.

I have selected for illustration the forms successfully tested by me, but do not desire to restrict the invention thereto, so long as the essential characteristics of my invention are secured by means substantially equivalent; as, for example, the blade E may be permanently secured to the handle A B, and not adjustable. The portion E' of the blade may be also dispensed with, and the gauge D, the instrument still being serviceable in an inferior degree for paring potatoes, &c.

The recess C being of tapering form, as shown in fig. 4, the thickness of the parings can be adjusted, even if the gauge be removed, by the provision of adjustability in the blade E on the handle A B The instrument, as shown in fig. 1, is not only adapted for paring, but for cutting vegetables and fruit into thin slices of definite thickness.

*Claims.*

1. The combination of the handle A B and blade E, connected and operating substantially as described and for the purpose specified.

2. The combination of the handle A B and adjustable blade E *e e'* F F', as and for the purpose specified.

3. The combination of the gauge-piece D with the handle A B and knife-blade E, substantially as described and for the purpose specified.

4. The knife E, when formed with a scoop G or G', as and for the purpose specified.

In testimony of which invention I hereunto set my hand.

JOHN JACOB LEBEAU.

Witnesses:
FRANK MILLWARD,
J. L. WARTMANN.